United States Patent [19]

Yasui

[11] Patent Number: 4,948,359

[45] Date of Patent: Aug. 14, 1990

[54] MOLD HOLDING AND POSITIONING MEANS FOR USE WITH WAX INJECTOR

[75] Inventor: Shozui Yasui, Tokyo, Japan

[73] Assignee: M. Yasui & Co., Ltd., Tokyo, Japan

[21] Appl. No.: 131,510

[22] Filed: Dec. 11, 1987

[51] Int. Cl.$^5$ ............................................... B29C 45/04
[52] U.S. Cl. ..................................... 425/576; 425/589; 425/595
[58] Field of Search .................. 249/54, 127; 425/408, 425/411, 440, 441, 447, 195, 450.1, 451.9, 589, 574, 595, 569; 425/574, 589, 595, 569

[56] References Cited

U.S. PATENT DOCUMENTS

| | | | |
|---|---|---|---|
| 3,687,590 | 8/1972 | Cyriax | 425/450.1 |
| 3,986,805 | 10/1976 | Haines | 425/450.1 |
| 4,005,974 | 2/1977 | Szabo | 425/450.1 |
| 4,191,523 | 3/1980 | Niedergast et al. | 425/408 |
| 4,309,164 | 1/1982 | Egger et al. | 425/589 |
| 4,315,728 | 2/1982 | Hehl | 425/589 |
| 4,332,544 | 6/1982 | Aoki | 425/589 |

FOREIGN PATENT DOCUMENTS 257530  7/1982  Fed. Rep. of Germany .

*Primary Examiner*—Willard Hoag
*Attorney, Agent, or Firm*—Harlan P. Huebner

[57] ABSTRACT

The present invention relates to a wax mold holding and positioning apparatus for use with a wax injector machine where a pressure holding means uniformly clamps a two piece wax mold together and a mold positioning means is employed to move said mold to said wax injector, said apparatus including universal coupling means adapted to make any final angular shifting or adjustment to assure a firm sealing contact of a sprue hole in said mold with the wax injector to force wax through a channel in the mold to a pattern cavity therein.

9 Claims, 4 Drawing Sheets

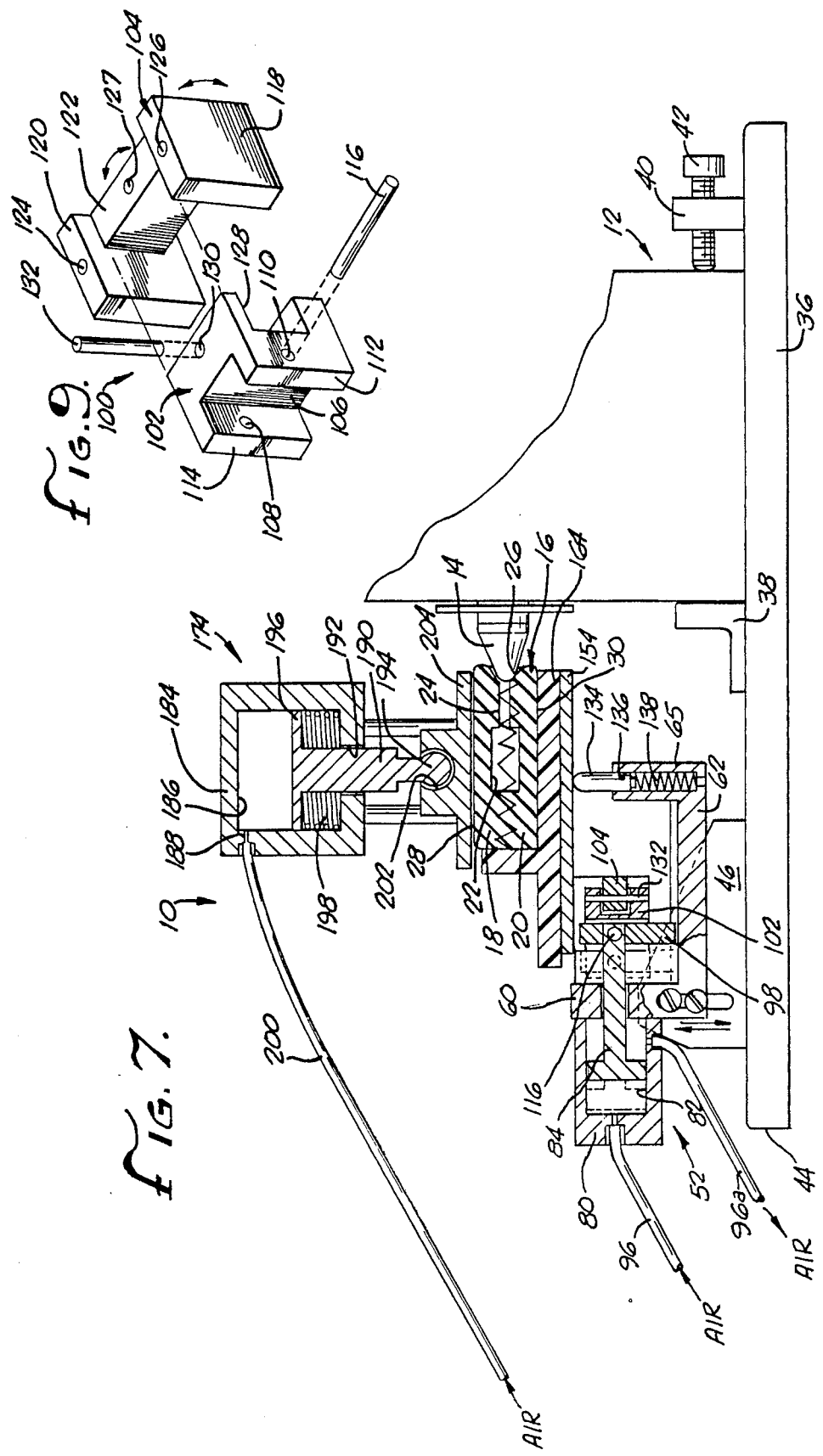

MOLD HOLDING AND POSITIONING MEANS FOR USE WITH WAX INJECTOR

BACKGROUND

1. Field of the Invention.

This invention relates to mold holding and positioning means for use with a wax injector that fills the mold with a wax impression of a cavity pattern inside the mold.

2. Description of the Prior Art.

In the Lost Wax Process of metal casting the process is based upon a basic principle of making by carving and shaping wax into the pattern of the finished product desired.

The pattern is then surrounded by an investment plaster that hardens to form a mold.

After the mold is made it is heated in an oven and the wax melts away and is "lost". This leaves the mold empty and metal is then heated and cast into the cavity left by the "lost wax". In this way the cast metal will duplicate the pattern in the mold.

After the metal has been cast and setup, the mold of hard plaster is broken and the metal duplicate is removed and finished by appropriate means.

In view of the fact that the hard mold is destroyed and the wax pattern is "lost", unless there were some way to preserve the wax pattern the shape and pattern would become truly lost.

Thus in order to preserve the wax pattern, if it is desirable to product additional casts of the pattern, a rubber of silicon mold is produced. In this way a number of wax impressions or patterns may be made and then placed in a number of investment plaster molds, or a family of impressions may be affixed to wax to form a tree. In this way the tree can be placed in an investment plaster, burned out so that a number of duplicate patterns may be cast.

It is known in the art that there are wax injector machines where the rubber or silicon mold is hand pressed to the machine for injection and forming of the wax pattern. There are also machines known that have the capability of forming a vacuum to remove impurities within the pattern cavity of the rubber mold.

Generally, in the prior art the pattern is placed into a frame and the rubber or silicon is poured around the pattern. After the vulcanization takes place, usually the mold is cut apart forming upper and lower halves each having outer flat surfaces. The wax pattern or other material pattern is removed and a channel from the pattern to a side of the mold is provided terminating in an outer sprue hole. A sprue hole is a tapered hole from the mold surface to the connecting channel.

Heretofore, the rubber duplicative molds have manually been held against wax injector machines which may result in bubbles in the wax and poor impressions or depending on the seat and pressure against the wax injector incomplete impressions. In other words there has been no consistency in the pressure.

In addition when the two halves are pressed together the downward pressure has not been consistent and faulty wax impressions are created through distortions of the cavities.

Finally, in some instances if the sprue hole is not properly positioned on a true center line, the engagement with the wax nozzle of the wax injector is faulty and a wax impression may not be properly formed.

Applicant is however aware of one patent which has attempted to provide a rubber mold holding means to be used with a wax injector. That patent is West German Patent No. 3024197 issued to Alexander Messing. From a translation the Messing structure disclosed will allow up and down as well as horizontal movement of a plate holding a mold, however there is no universal means for final alignment of a sprue hole with a wax nozzle. There must be exact positioning in order to align the hole and nozzle. This requires greater precision and time to accomplish the result. That invention is really limited to just a two dimensional movement.

Also the West German patent makes no provision for a swivel pressure plate to maintain the mold in a closed position. The clamp of the German patent appears to also be inflexible with a plate engaging the mold straight on with no swivel or universal adjustability for engaging the mold to assure proper closure pressure on the molds no matter how irregular the surface of the mold might be.

SUMMARY OF THE INVENTION

It is an object of the present invention to provide a mold holding and positioning clamp that is actually capable of three dimensional universal movement to assure proper interfit of the mold with a wax injector machine.

Another object of the present invention is to provide a swivel clamp means on the mold holding and positioning clamp means to assure proper clamping of a two section mold and to assure constant pressure for the clamping function.

A still further object of the present invention is to provide a mold holding and positioning clamp which will accomplish a proper fit of the sprue hole of a mold with a wax nozzle of a wax injector machine.

A further object of the present invention is to provide a mold holding and positioning clamp that is pneumatically controlled for positioning of the mold.

Another object of the present invention is to provide a mold holding clamp which includes a swivel horizontal movement means to move the mold held therein into proper contact with a wax nozzle.

A still further object is to provide a mold holding and positioning clamp which is relatively inexpensive to manufacture and relatively simple to operate.

These and other objects and advantages will become apparent from the following part of the specification wherein details have been described for the competence of disclosure, without intending to limit the scope of the invention which is setforth in the appended claims.

BRIEF DESCRIPTION OF THE DRAWINGS

These advantages may be more clearly understood from the following detailed description and by reference to the drawings in which:

FIG. 7 is side elevational view partly in section of the invention similar to FIG. 3 but showing the invention in its environment with a wax injector machine;

FIG. 9 is an exploded view of a universal joint of the present invention.

DETAILED DESCRIPTION OF THE PREFERRED EMBODIMENT

Figure 1:
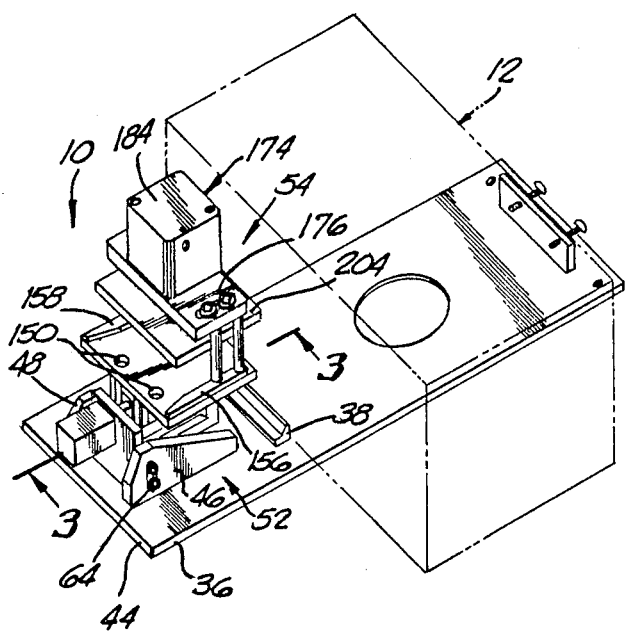
FIG. 1 is a perspective view of the mold holding and positioning means as it would be positioned with a wax injector machine.
Figure 2:
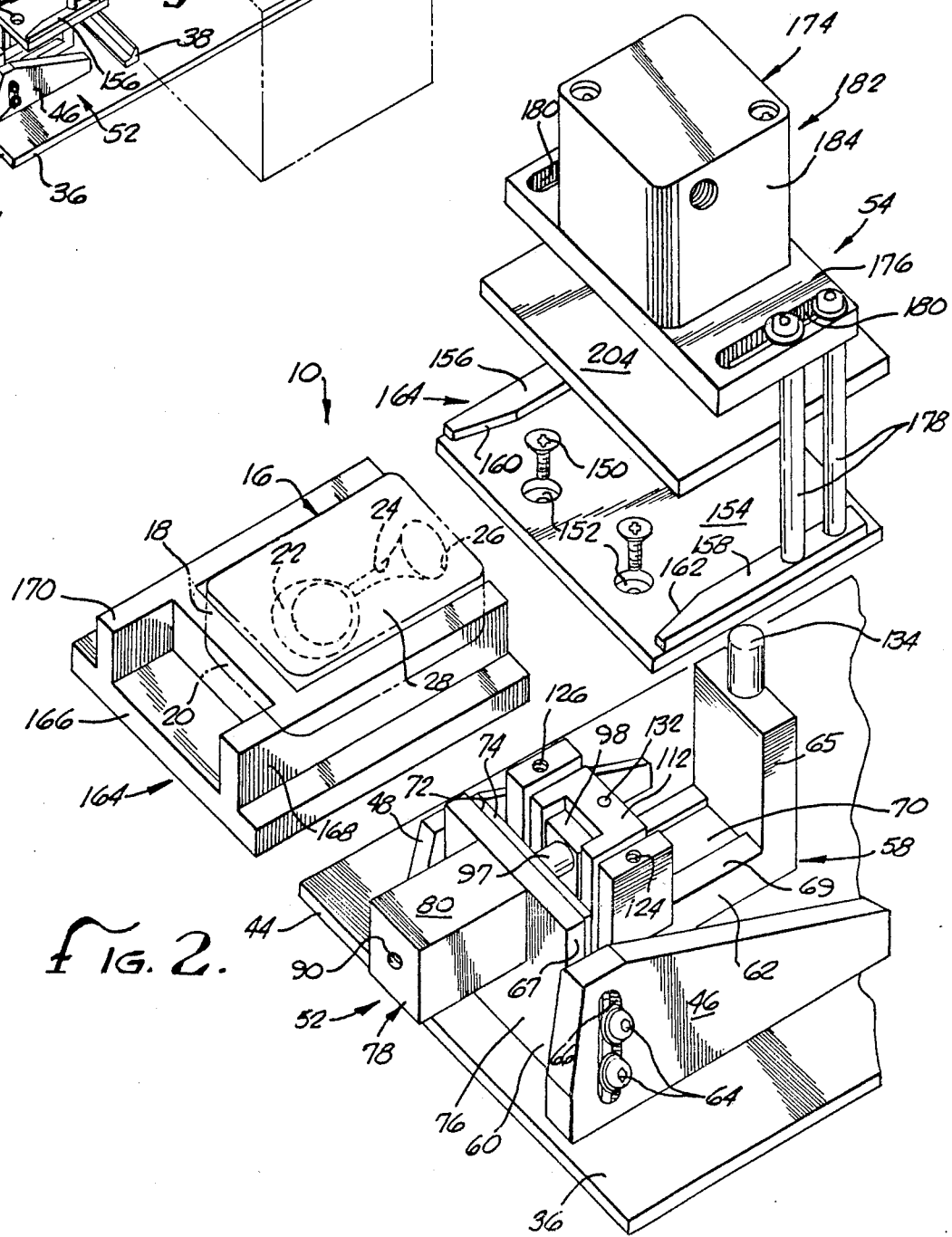
FIG. 2 is an exploded view of the mold holding and positioning means of the present invention.

Referring to the drawings and particularly FIGS. 1, 2 and 7 there is illustrated a mold holding and positioning means generally designated 10. The holding and positioning means 10 is adopted for use with and coupled to a conventional wax injector machine designated 12.

A wax injector machine 12 may be of any of the well known type that will liquefy wax and force the wax through a wax nozzle 14 into a conventional rubber or silicon mold 16. The mold 16 is in two pieces with an upper half and lower mating half 18 and 20. The mold 16 has a pattern cavity 22 where there is a channel 24 that extends outward from the pattern terminating in a funnel shaped tapered sprue hole 26 which communicates with the exterior of the mold.

Figure 3:
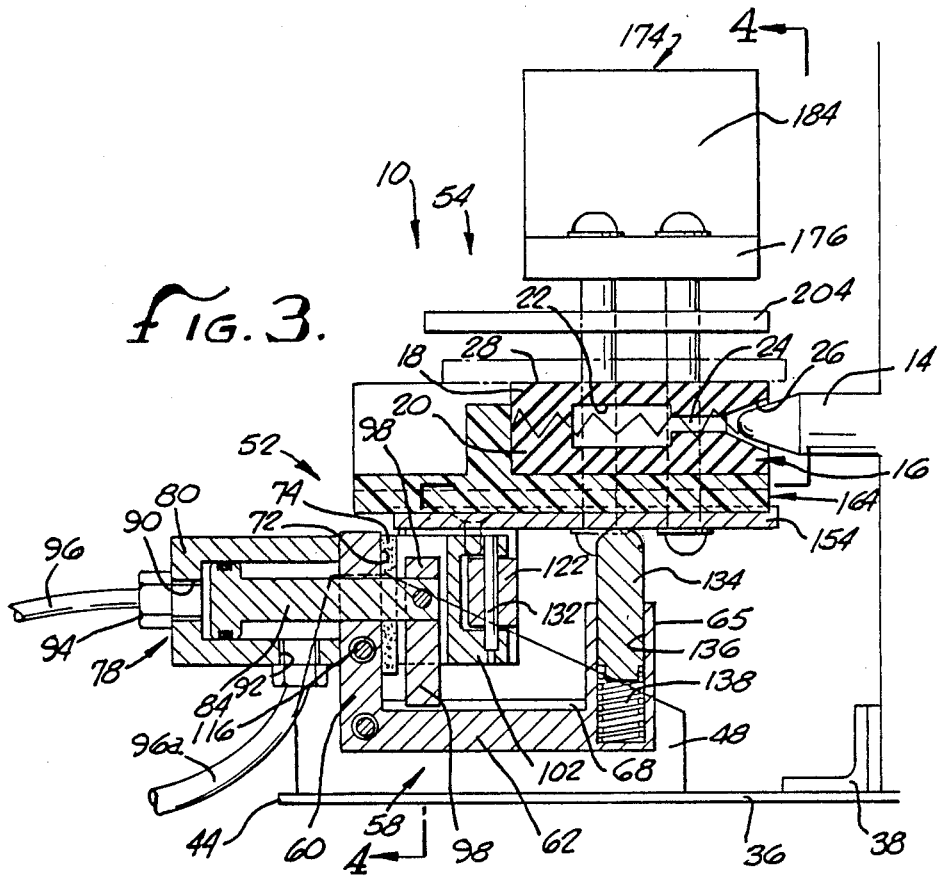
FIG. 3 is side elevational partial sectional view of the present invention taken on line 3—3 of FIG. 1.

As can be seen in FIGS. 3 and 7 the wax nozzle 14 is to engage and seat in the sprue hold 26 so that wax can be injected through the sprue hole and channel into the pattern cavity.

Once the pattern cavity is filled with wax and cooled the mold 16 may be opened and the wax impression removed and a casting be made by the Lost Wax Process described in the preamble of this specification.

The mold 16, as can be seen, is preferably formed in a rectangular frame (not shown) so that there are parallel ends and sides as well as a generally flat top surface 28 on the upper half 18 and a generally flat bottom surface 30 on the lower half 20.

The mold holding and positioning means 10 has a base plate 36 upon which the wax injector machine 12 may be seated. There is preferably a stop bar 38 that bears against the front of the machine 12. At the rear of the base plate 36 there is a bracket 40 and set screw 42 to bias against the machine 12 and lock the machine and clamp means together.

Adjacent the front end 44 of the plate 36 in spaced relationship one from the other are a pair of upright support brackets 46 and 48 welded or otherwise secured to the base plate 36. Mounted between the brackets 46 and 48 is the mold holding and positioning means 10.

The mold holding and positioning means 10 includes lower universal mold positioning means generally designated 52 and upper mold receiving and pressure holding means generally designated 54.

The lower universal mold positioning means 52 includes an elongated generally U shaped frame generally designated 58. The frame 58 includes a front vertical wall section 60, lower base section 62 and a rear vertical pin support wall section 65 spaced from the wall 60, see FIG. 2. The width of the front vertical wall 60 preferably corresponds to the space between support brackets 46 and 48. The wall 60 is mounted within the brackets 46 and 48 by means of bolts 64 that pass through slotted opening 66 into the edges 67 of the wall 60. With the slotted openings 66 the frame 58 is vertically adjustable the purpose of which will be subsequently explained.

Figure 4:
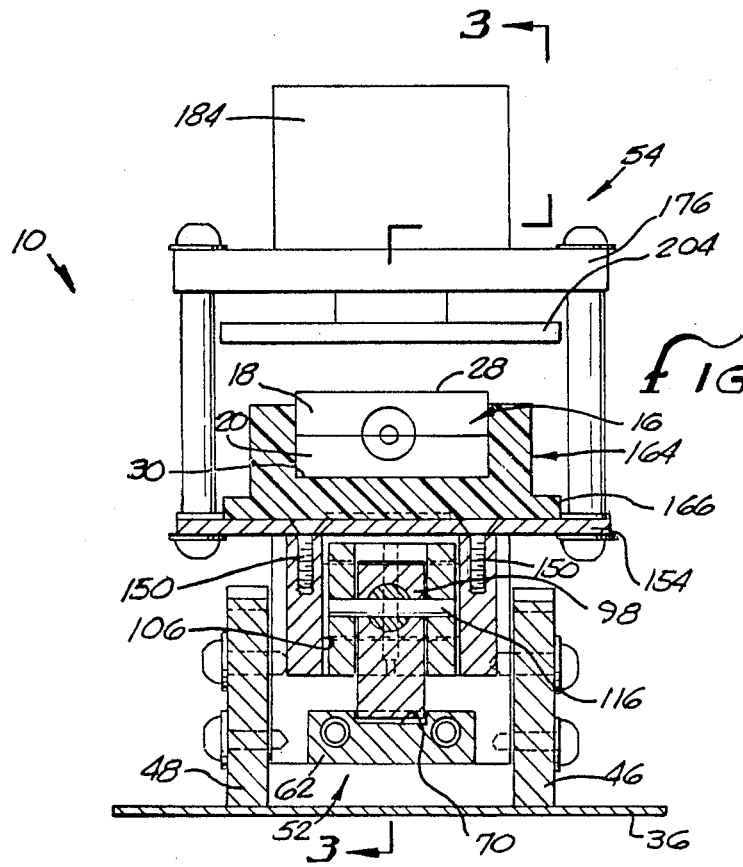
FIG. 4 is an end elevational partial sectional view of the present invention taken on line 4—4 of FIG. 3.

The base section 62 and rear vertical wall are of a lesser width than the width of wall 60, see FIGS. 1 and 4. Also on the inner surface 69 there is a groove 70.

Affixed to the rear surface 72 of vertical plate 60 is a rubber stop 74 to be explained.

Figure 6:
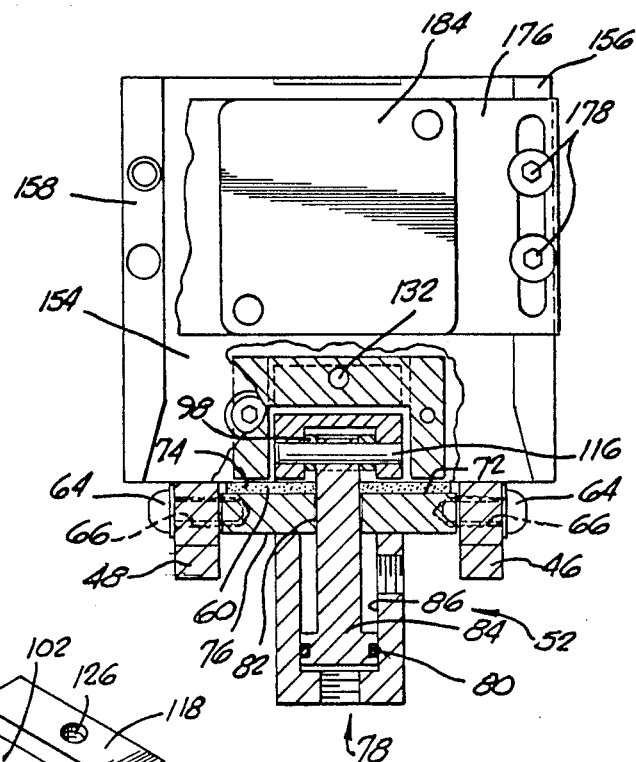
FIG. 6 is a top view partially in section of universal adjustment means for the mold holding means.

Mounted on the front surface 76 of vertical wall 60 is a horizontal cylinder means generally designated 78. The cylinder means 78 includes a housing 80 communicating with a bore 82, see FIG. 6, through the wall 60. Mounted within the housing 80 is preferably an air actuated piston 84 adapted to slidably move within a cylinder bore 86 rearwardly through the wall 60. The piston 84 includes an O ring seal 88. The housing 80 also includes air inlet and air outlet ports 90 and 92. By conventional couplings 94 and air hoses 96 and 96a air by any known means may be pumped into port 90 to urge the piston 84 rearwardly and air may be evacuated through port 92 to allow the piston to return. Upon its return the piston 84 is cushioned against the rubber stop 74.

Figure 8:
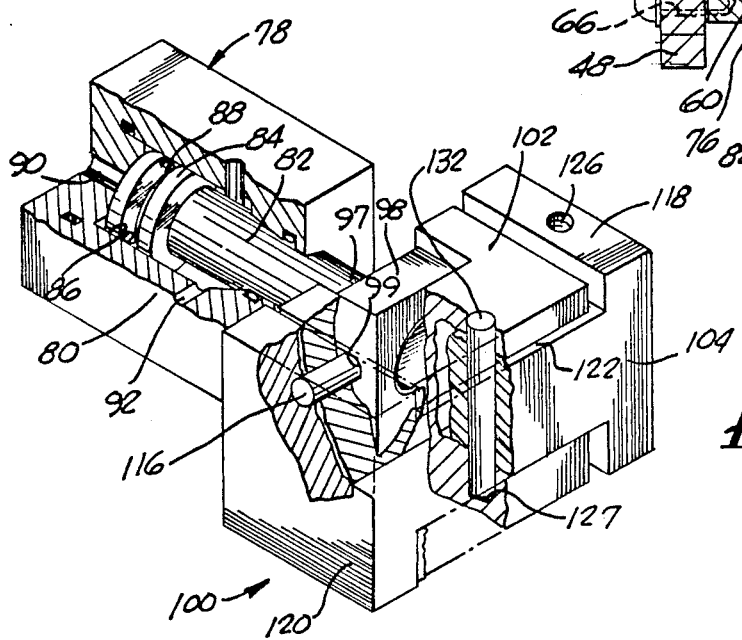
FIG. 8 is a perspective view of the universal adjustment means of FIG. 6.

The piston 84 at end 97 is coupled to piston block 98 having a horizontal bore 99 which in turn is pivotally connected to a universal type joint means generally designated 100, see FIG. 8 and 9.

The universal type joint means 100 allows limited vertical and horizontal movement and includes a first half 102 and a second half 104. The first half 102 includes a vertical cutout 106 which extends vertically through the half 102. In addition, there are bores 108 and 110 extending horizontally through the end tabs 112 and 114 formed by the cutout 106. The bores 108 and 110 are adapted to be aligned with bore 99 of block 98 and the two parts are held together by horizontal retaining pin 116.

The second half 104 of the universal joint means 100 includes a pair of end blocks 118 and 120 with a horizontal tie bar section or bridge 122 extending therebetween, see FIG. 9. The end blocks 118 and 120 have vertically threaded bores 124 and 126 to receive the upper mold receiving and holding means 54. In addition, there is a bore 127 that extends vertically through the bar section 122.

The first half 102 of the joint means 100 includes a rear horizontal recess 128 with a centrally located vertical bore 130. When the first half 102 is positioned with the second half 104 the bar section 122 is interfitted within the recess 128. The two parts 102 and 104 are held together by the passage of vertical retaining pin 132 therethrough. This then completes the joint 100 whereby the second half 104 of the joint can pivot both horizontally and vertically within a limited area.

Finally, as relating to the universal mold positioning means 52, projecting vertically out of the rear wall 65 is a vertical biasing pin 134 which is mounted in bore 136. The pin is biased outwardly by coil spring 138, and it is adapted to bear against the upper mold receiving and holding means 54.

The upper mold receiving and holding means 54 is attached to the lower universal mold positioning means 52 by means of a pair of screws 150 which extend vertically through holes 152 in mold receiving base plate 154 into the threaded bores 124 and 126 respectively. In addition, the base plate rests on the spring loaded pin 134 so that plate 154 will always return to the horizontal if it is depressed downward from the horizontal.

The base plate 154 is preferably rectangular in shape and includes a pair of side mold guide plates 156 and 158 that are tapered at 160 and 162 to guide a mold holding means generally designated 164, see FIG. 2. The guide means 164 may be made of plastic or any other suitable material for maintaining a mold 16. There is a base portion 166 that is adapted to rest on the base plate 154 and a pair of spaced apart upright walls 168 and 170. The space between the walls 168 and 170 is sufficient to snugly receive a rubber mold 16, see FIG. 2. While the guide 164 is preferred, so that a number of molds 16 may be placed in a number of guides for individual quick insertion, such a guide 164 is not essential. It is possible that the rubber molds 16 may each be positioned directly on the base plate 154 without departing from the spirit of the invention.

Suspended above the base plate 154 is a pressure platten means 174 adapted to be activated by appropriate means such as air pressure to press the two halves 18 and 20 together so that wax may be injected and a wax mold formed in the cavity 22.

The pressure platten means 174 includes a retainer plate 176 which is connected to the base plate 154 by spacer bolts 178 that pass through slotted openings 180 in the retainer plate 176. By having slotted openings the retainer plate 176 may be shifted forwardly or rearwardly above the base plate 154 as is necessary to fully cover a mold 16.

Mounted on the retainer plate 176 is a pneumatic cylinder means designated 182 including a cylinder block 184. The block 184 has a piston chamber 186 (see FIG. 17) with an air inlet/outlet 188. Mounted within the chamber 186 is a piston 190 that extends through a bottom opening 192 and terminates as a ball for a swivel coupling. At the opposite end of the piston flange 196 that extends outwardly of the piston 190 filling the internal horizontal area of the chamber 186.

Mounted under the flange 196 around the piston and biased against and bottom of the chamber 186 is a compression spring 198 to urge the piston upward.

There is preferably an air hose 200 extending from coupling 188 to an air source (not shown).

The ball 194 is fitted into a socket 202 formed in a mold platten plate 204. The ball 194 and socket 202 from a swivel joint.

In operation, when the mold holding means 164 is positioned on the base plate 154 the piston 190 may be activated by air and it and the platten plate 204 will move downward, see FIG. 7, engaging and holding the mold 16 and its halves 18 and 20 under pressure. With the swivel ability of the platten 204 if the mold surfaces are not parallel the plate 204 may be swiveled to assure a complete contact with the top surface of the mold and proper even overall pressure will be applied with no distortion of the cavity 22.

Figure 5:
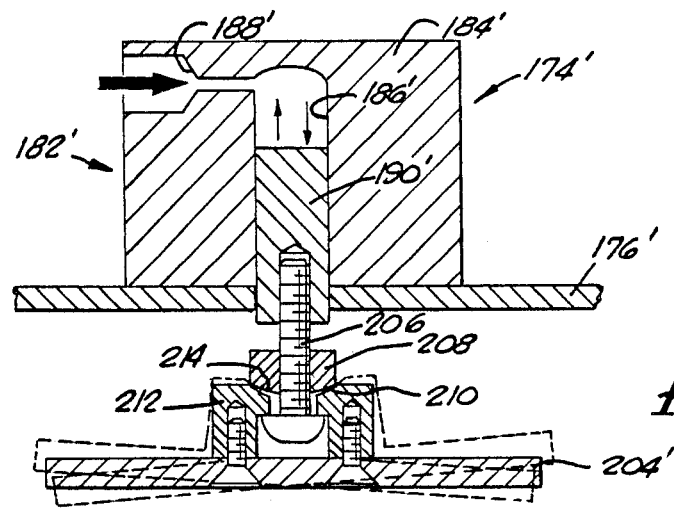
FIG. 5 is a cross sectional view of a modified pressure platten means of the present invention.

In FIG. 5 there is illustrated a modified cylinder means 182'. The housing 184']includes an annular piston chamber 186' and an air inlet/outlet coupling 188' that may be connected to an air supply not shown. Mounted within the chamber 186' is an annular piston 190' adapted to be moved down by air being pumped into the chamber and reversed to expel the air and move the piston back into the chamber.

In the modification attached to the mold platten plate 204' there is a swivel means in the form of a bolt 206 passing from the piston 190' through a nut 208 having a convex outer surface 210 which seats in a concave seat member 212 having a concave seat 214.

In operation the mold holding and positioning means is positioned adjacent a conventional wax injector 12 where the nozzle 14 is positioned between the base plate 154 and the platten 204 when in an upper position. This may be accomplished by adjusting bolts 64 to raise and lower the entire assembly to the general position.

Next depending upon the perimeter size of the mold 16 the platten plate 204 may be shifted forwardly or rearwardly so as to assure a complete coverage of the particular mold or molds that may be used. This usually is accomplished by placing a first guide 164 on the base 154 by inserting the same between guide plates 156 and 158.

Once a guide 164 with a mold 16 is in place, that is when the rear edge with the sprue hole 26 is generally adjacent the wax injection nozzle, the universal mold positioning means 52 is activated for generally true alignment of the sprue hole 26 and nozzle.

To accomplish the final positioning of the mold air passing through line 96 will urge piston 84 rearwardly, toward the wax injector, which will cause the universal joint means 100 and the attached pressure platten means 174 to move positioning the sprue hole 26 for contact with the nozzle.

Because of the universal joint should the nozzle not engage the sprue hole directly on its encounter to properly seat the nozzle there is pivotal motion of the joint and in turn the pressure platten means 174 so that the mold will be able to seek a proper fit by shifting up or down or side ways as the sprue hole moves into tight contact with the nozzle.

In view of the fact usually every mold sprue hole 26 and channel 24 are hand made and a true center for the hole and channel cannot always be assured, the present invention due to the universal joint may move within an appropriate $\frac{1}{4}$" radius around the center of the nozzle 14 to assure a proper seal.

The biasing pin 134 will always urge the mold and its pressure means upward to compensate for the universal mold positioning means. In other words the mold may be tipped downwardly for contact but after the mold is filled with wax and the air injected through hose 98, FIG. 7, the means 52 is shifted forwardly and the base plate 154 is righted to the horizontal.

It can thus be seen that with the present device a number of guides 164 may be filled with molds 16, and each one inserted one after the other when each is adjusted and the final alignment occurs through the universal joint and its shifting. There is also assured an even and constant pressure with each mold.

Once the wax is injected and cooled the air in the chamber 186 may be evacuated and the mold being released can be removed from the apparatus and a new mold inserted.

While not forming a part of the present invention the operation of the mold positioning means to move the mold into nozzle contact may be automated and tied in with the injecting of wax into the mold.

In addition, without departing from the spirit of the invention the pneumatic means to activate the platten plate and the universal mold positioning means may be replaced with hydraulic pumping means.

The invention and its attendant advantages will be understood from the foregoing description and it will be apparent that various changes may be made in the form, construction and arrangements of the parts without departing from the spirit and scope thereof or sacrificing its material advantages, the arrangements herein before described being merely by way of example. I do not wish to be restricted to the specific forms shown or uses mentioned, except as defined in the accompanying claims, wherein various portions have been separated for clarity of reading and not for emphasis.

I claim:

1. In mold holding and positioning apparatus including an adjacent wax injector machine having a wax injection nozzle for forcing liquid wax into a flexible mold, a flexible mold having a pattern cavity in said mold wherein a sprue hole is defined projecting inwardly from an exterior surface of said mold connected with said cavity by a channel, said flexible mold being formed into two halves along a generally horizontal cut, said apparatus includes a generally flat base, mold positioning means mounted upon said base, said means including a piston horizontally shiftable in reverse directions so that as it moves in one direction it moves toward said wax injector, vertically adjustable mold holding means above said mold positioning means and mounted thereon to receive said flexible mold and position said sprue hole of said mold vertically in general alignment with said nozzle, said holding means including pressure pattern means activatable to exert downward pressure on said mold to maintain said halves together during wax injection, and horizontally shiftable with said mold positioning means for engagement of said sprue hole with said nozzle, the improvement comprising:
  universal coupling means connecting said mold positioning means and said vertically adjustable mold holding means adapted to allow limited 365° relative movement therebetween and to permit turning said mold about said nozzle to assure tight sealing engagement therewith as said mold positioning means moves into engagement with said nozzle.

2. In mold holding and positioning apparatus as defined in claim 1 wherein:
  said universal coupling means is secured to said piston for horizontal movement toward said wax injector machine, and said universal coupling is also secured to said mold holding means.

3. In mold holding and positioning apparatus as defined in claim 1 wherein said universal coupling means includes:
  a first half pivotally mounted to said piston and adapted to pivot about a horizontal axis;
  a second half pivotally interconnected with said first half section and adapted to pivot about a vertical axis, whereby said second half may restrictably rotate 365° ; and
  said mold holding means is fixedly mounted on said second half whereby said universal coupling means will allow said clamped mold to universally move to seek a sealing position with said nozzle whether initially exactly aligned due to variances in location of a sprue hole.

4. In mold holding and positioning apparatus as defined in claim 2 wherein:
  biasing means are mounted on said mold positioning means spaced from said piston adapted to bear against a portion of said mold holding means and prevent unrestrained universal movement of said holding means.

5. In mold holding and positioning apparatus as defined in claim 4 wherein said biasing means includes:
  a spring loaded vertical biasing pin.

6. In mold holding and positioning apparatus as defined in claim 1 wherein each of said mold positioning means and said mold holding means includes:
  pneumatic actuation means to move said piston and said pressure platten means.

7. In mold holding and positioning apparatus as defined in claim 1 wherein said pressure platten means includes;
  a pressure plate vertically movable to engage the top half of said mold and press the same into contact with the lower half;
  a vertical piston above said pressure plate; and
  swivel coupling means interconnecting said pressure plate and said vertical piston whereby said pressure plate may compensate for unequal top and bottom surfaces of said flexible 8. In mold holding and positioning apparatus as defined in claim 3 wherein:
  said first half is rectangular with a rear wall and a generally parallel therewith front wall, said rear wall having a vertical recess extending inwardly and throughout the height of said first half forming a pair of spaced apart parallel vertical walls, and said front wall having a horizontal recess extending inwardly and throughout the width of said first half forming a pair of spaced apart parallel horizontal walls;
  said second half is elongated in width including a pair of spaced side plates and a horizontal tie bar therebetween, the space between said side plates complimentary with the width of said first half and said tie bar of a thickness complimentary with the width of said recess;
  said first half interfitted within said side plates and said tie bar is received in said horizontal recess; and
  a pivot pin passing through said parallel horizontal walls and said tie bar to unit said sections for restricted universal movement.

9. In mold holding and positioning apparatus as defined in claim 1 wherein said generally flat base includes:
  locking means to position said wax injector machine adjacent to said mold positioning means and said mold holding means to present said wax nozzle to said sprue hole.

* * * * *